United States Patent Office 2,868,831
Patented Jan. 13, 1959

2,868,831

ALKYL METHYLENEPHENYLVALERATE

Charles H. McKeever, Meadowbrook, and Louis R. Freimiller, Philadelphia, Pa., assignors to Rohm & Haas Company, Philadelphia, Pa., a corporation of Delaware No Drawing. Application January 10, 1956
Serial No. 558,203

18 Claims. (Cl. 260—476)

This invention relates to alkyl methylenephenylvalerates and to a method for their preparation.

The compounds of this invention may be represented by the formula

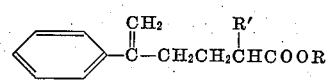

in which R' may represent a hydrogen atom or an alkyl group of not over four carbon atoms and R may represent a hydrogen atom or an alkyl group of one to eighteen carbon atoms.

Typical of the representations of R' there may be employed a hydrogen atom or a methyl, ethyl, propyl, isopropyl, butyl, isobutyl, or tert-butyl group. As R there may be typically used a hydrogen atom or a methyl, ethyl, butyl, pentyl, hexyl, octyl, decyl, dodecyl, tetradecyl, or octadecyl group in any of the possible spatial configurations including alkyl substituents on alkyl chains. It is to be understood that the alkyl representation of R includes both the cyclic and acyclic arrangements. Typical of the cyclic members that may be used as R include cyclobutyl, cyclopentyl, methylcyclopentyl, butylcyclopentyl, cyclohexyl, propylcyclohexyl, diethylcyclohexyl, trimethylcyclohexyl, and the like. R actually may stand for alkoxyalkyl or alkylaryl groups of three to eighteen carbon atoms but some of the ether groups tend to be somewhat unstable and the alkylaryl groups need at least two carbon atoms between the aryl portion and the carbonyl carbon atom in order to give entirely satisfactory results. Therefore, such groupings are not preferred.

The compounds of this invention are preferably prepared by bringing together at a reacting temperature and pressure α-methylstyrene and a compound having the formula

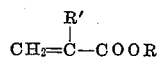

in which R and R' have the significance previously set forth. The reaction may be conducted in the temperature range of about 200° to 450° C., preferably 275° to 350° C. Temperatures appreciably below 200° C. cause a reaction too sluggish to be practical and appreciably above 450° C. lead to degradation products. Hence, in order to assure satisfactory results the temperature ranges set forth should be adhered to.

Pressures greater than atmospheric are required to effect the present reaction. Pressures in the range of about 400 to 4000 p. s. i. g. may be used with 1000 to 3000 p. s. i. g. preferred. Usually at the outset of the reaction hydrogen or nitrogen is introduced to any desired pressure and then ensuing pressures are obtained and maintained autogenously at the temperature of reaction.

If the ester form of the reactant

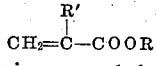

is employed, a solvent is not needed, but, if the acid form is used, that is, when R is equal to a hydrogen atom, a solvent is preferred in order to minimize the polymerization tendencies of the reactant under the present reaction conditions. A volatile inert organic solvent such as benzene toluene, or the like may be used which may be easily removed by evaporation or distillation at the conclusion of the reaction. Since the reactants are liquid at normal room temperatures or slightly above a solvent is not required except under the conditions set forth heretofore.

The present reaction is preferably conducted on a continuous basis rather than as a batch process simply because any tendencies of the reactants to polymerize or copolymerize, and thereby detract from the desired overall result, can be substantially eliminated. It is quite possible to conduct the present reaction on a batch basis but the yields of desired products are somewhat reduced because of competing polymerization and copolymerization reactions. Polymerization and copolymerization occur at temperatures below the present reaction temperatures and therefore, maximum yields of a desired product are obtained when the reactants are treated rapidly and cooled rapidly. When the present reaction is conducted on a continuous basis there is no appreciable deterrent polymerization or copolymerization of the present reactants under the present reaction conditions. Hence, the reaction of the present invention is preferably conducted on a continuous basis.

Since polymerization and copolymerization of the reactants occur at temperatures below the present reaction, it is desirable to bring the temperature of the reactants rather rapidly to the reaction temperature, maintain the temperature in the reaction range for a desired length of time, and then rapidly cool the product and unused reactants. In this way a maximum of the desired product is obtainable. The most advantageous holding time, that is, the length of reaction time at which the reactants are held when the reaction is conducted on a continuous basis, will vary according to the temperature, pressure, and specific reactants employed. The holding time consideration is a matter of advantage and convenience and not one of criticality. The reaction occurs satisfactorily within the defined reaction conditions with generally somewhat greater yields occurring at the higher temperatures of the reaction range and at larger reaction times.

As an illustration of the effect of time and temperature at a constant pressure in the method of the present invention, wherein α-methylstyrene is reacted with the reactant

in which R is a methyl group and R' is a methyl group, the same results, in which the yields approach the maximum, are obtained by conducting, at 1000 p. s. i. g., the present reaction for two minutes at 350° C., four minutes at 325° C., and eight minutes at 300° C. Similar advantageous relationships are readily obtained for the other reactants of this invention.

The present reaction can be conveniently conducted on a continuous basis by employing a coil or tube in a hot salt or electric bath. Liquid and gaseous components may be bled off, as desired, during the course of the reaction to maintain a constant selected pressure. Using such an arrangement conversions of 10 to 50% per pass are advantageously obtained with yields consistently exceeding 85%. The products are isolated by distillation, preferably under reduced pressure.

The reactants of this invention are united on a mol for mol basis and it is desirable to employ such a ratio of reactants. If it is desired to use an excess of one of the reactants, α-methylstyrene may be used in ratios up to about 3 to 1. An excess of the

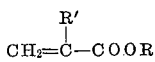

reactant should be avoided because the excess amount tends to polymerize and thereby inconveniently contaminate the desired product of the reaction. The use of α-methylstyrene as one of the reactants is vitally important. Apparently the α-methyl group imparts an unusually beneficial characteristic to the present reaction, the mechanics of which are not clearly understood. An attempt to use styrene itself in the present reaction leads to abysmal failure because under the instant reaction conditions, styrene preferentially polymerizes and completely defeats the purposes of this invention. Hence, one of the reactants of this invention must be α-methylstyrene, or, possibly, α-methylstyrene with one or more methyl or ethyl ring substituents and nothing else.

It is a surprising aspect of this invention that the reactants unite as they do. Both reactants are known polymerizers and each would polymerize at the instant reaction conditions were it not for the unexpected preferential affinity one reactant has for the other. Under the present reaction conditions, especially when the reaction is conducted on a continuous basis, the desired products of this invention are obtained with no appreciable polymerization interference.

As a precautionary measure, it is preferred to conduct the present reaction in the absence of air and, particularly if the reaction is conducted batchwise, a polymerization inhibitor such as hydroquinone, dihalonaphthol, paraphenylenediamine or the like may be employed.

It is often advantageous to employ the methyl ester of the reactant

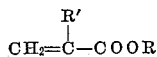

that is, when R is a methyl group, and then, after the union with α-methylstyrene, transesterify to any of the other desired products of this invention. The transesterification is preferably conducted at the reflux temperature of the reaction mixture in the presence of, preferably, a strongly acidic esterifying catalyst such as sulfuric acid, a lower alkanesulfonic acid such as butanesulfonic acid, or an arylsulfonic acid such as p-toluenesulfonic acid, and the like, or a strongly alkaline esterifying catalyst such as sodium methoxide. It is, also, possible to employ a strongly acid ion-exchange resin such as a sulfonated polystyrene or sulfonated phenol-formaldehyde resin. If desired, small amounts of a volatile inert organic solvent, such as toluene, xylene, or the like, may be used to help regulate the reflux temperature. Methyl alcohol is distilled off as the transesterification progresses and the reaction is continued until the theoretical amount of methyl alcohol is collected. At the conclusion of the transesterification, the product is isolated, such as by neutralizing the catalyst, filtering, and distilling, preferably under reduced pressure.

The products of the present invention are liquids water-white to light yellow in color. The present compounds are useful as repellents for the common house fly. In percentages as low as 1.0 to 2.0% by weight, the present compounds exhibit marked effectiveness when applied in a common oil-base spray carrier. They may also be employed in aqueous emulsions, aerosols, or dusts. There may be incorporated other desired pestistats and pesticides, as desired, by known methods. The present compounds are valuable plasticizers, especially for polyvinyl chloride. For instance, a mixture of 35 parts of 2-ethylhexyl 2-methyl-5-methylene-5-phenylvalerate, 65 parts of polyvinyl chloride, and one part of cadmium-barium laurate was milled for three minutes. A colorless, tough, durable, tear-resistant, flexible film of good compatibility was formed that was quite satisfactory. The other compounds of this invention give similar results.

The compounds of this invention may be reacted with formaldehyde to give a hydroxyethyl group in place of the methylene group. This derivative may then be esterified with itself or other alcohols or esters to form polyester compounds valuable as permanent plasticizers for polyvinyl chloride, nitrocellulose, and the like. The instant compounds may be reacted with phthalic anhydride, glycols or other alcohols, and drying or semi-drying oils to produce oil-modified alkyd resins useful in varnishes and other coatings. By chlorinating the double bond of the methylene group in the present compounds, there are produced compounds valuable as herbicides and insecticides. The copper salts of the compounds of this invention are valuable fungicides, being particularly useful in preventing mildew when applied to tents in amounts as low as .01 to 2.0% by weight in a kerosene base.

The compounds of the present invention and the method for their preparation may be more clearly understood from the following examples which are offered by way of illustration and not by way of limitation and in which parts by weight are used throughout.

*Example 1*

A reaction coil constructed of 15 feet of ¼ inch I. D. stainless steel high-pressure tubing immersed in a salt bath, is flushed with hydrogen, then pressurized to 1000 p. s. i. g. and heated to 300° C. A mixture of 3540 parts (30 moles) of α-methylstyrene and 1500 parts (15 moles) of methyl methacrylate is pumped through the coil at such a rate as to give an average contact time of four minutes. The temperature is maintained at 310–325° C. The reaction mixture, after leaving the coil, is quickly cooled to below 60° C. and collected in a high-pressure receiver. Constant pressure of 1000 p. s. i. g. is maintained by continuously bleeding hydrogen from the high-pressure receiver. At the completion of the reaction, the system is depressurized and the light brown, clear reaction mixture charged to a still along with a trace of di-β-naphthol. The distillation is carried out at reduced pressure yielding the product, methyl 2-methyl-5-methylene-5-phenylvalerate, B. P. 99° C. at 0.5 mm. pressure, $n_D^{20}=1.5149$, neutral equivalent=218 (calculated 218). The conversion is 12.2%. The recovered starting material contains about 30% methyl methacrylate and 70% α-methylstyrene indicating that the α-methylstyrene and methyl methacrylate react in a mole-to-mole ratio.

The methyl 2-methyl-5-methylene-5-phenylvalerate product is identified by the following series of reactions. Infra red and analytical data indicate the product is either

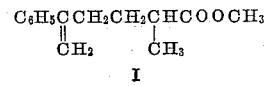

I or

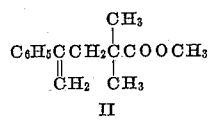

II

The ester product is saponified with potassium hydroxide to give the corresponding acid, B. P. 173–4° at 0.2 mm. pressure, $n_D^{20}=1.5319$, neutral equivalent=204 (calculated 204). A solution of the sodium salt of this acid is hydrogenated using Raney nickel catalyst. Four moles of hydrogen is consumed. The completely saturated acid is 2-methyl-5-cyclohexylcaproic acid, B. P. 137–8° at 1.1 mm. pressure, $n_D^{20}=1.4720$, neutral equivalent=212 (calculated 212). This saturated acid is then brominated by the well-known Hell-Volhard-Zelinsky procedure to yield the monobromo acid, 2-bromo-2-methyl-5-cyclohexylcaproic acid, B. P. 167–9° at 2.2 mm. pressure, $n_D^{20} = 1.5051$, neutral equivalent=301 (calculated 301). Only structure I would give a monobromo derivative, there being no hydrogen atoms alpha to the carbonyl in structure II.

*Example 2*

Example 1 is repeated except that the α-methylstyrene and methyl methacrylate are fed in a molar ratio of 1.3 to 1, and the average contact time is increased to six minutes. The same product is obtained in an overall conversion of 18.6%.

In a similar manner, employing ethyl methacrylate and α-methylstyrene in a molar ratio of 1 to 1.75 and reacting them at 2000 p. s. i. g. and 315° to 340° C. for eight minutes, there is produced ethyl 2-methyl-5-methylene-5-phenylvalerate.

*Example 3*

Example 1 is repeated using a reaction temperature of 350° C. The conversion to the desired methyl 2-methyl-5-methylene-5-phenylvalerate is 28.6%.

*Example 4*

A mixture of 2360 parts (20 moles) of α-methylstyrene and 2160 parts butyl methacrylate (15 moles) containing 0.1% hydroquinone is pumped through a reaction coil. A temperature of 325° C., pressure of 1000 p. s. i. g. and average contact time of six minutes are employed. The overall conversion to butyl 2-methyl-5-methylene-5-phenylvalerate is 19.5%.

In like manner, there is prepared, from α-methylstyrene and dodecyl α-butylacrylate, dodecyl 2-butyl-5-methylene-5-phenylvalerate.

*Example 5*

A reaction coil is heated to 300–325° C. and flushed and pressurized to 1000 p. s. i. g. with dry nitrogen. A mixture of 1180 parts (10 moles) of α-methylstyrene and 860 parts (10 moles) of methyl acrylate containing 0.1% methyl ether of hydroquinone is pumped through the coil maintaining a temperature of 300° C. and an average contact time of six minutes. The product corresponds to methyl 5-methylene-5-phenylvalerate. The conversion is 27% based upon the methyl acrylate charged. The product boils at 95° to 100° C. at 0.35 mm. pressure, has an $n_D^{20} = 1.5201$ and a neutral equivalent equal to 202 (calculated 204).

Analogously, ethyl 5-methylene-5-phenylvalerate is prepared by reacting α-methylstyrene and ethyl acrylate.

*Example 6*

A mixture of 2360 parts (20 moles) of α-methylstyrene and 1560 parts (10 moles) of hexyl acrylate containing 0.2% hydroquinone is pumped through a coil employing the operating conditions of 1500 p. s. i. g., 300° C. and an average contact time of five minutes. There is obtained as the product hexyl 5-methylene-5-phenyl valerate, in a conversion of 16.5% based upon the hexyl acrylate charged.

In a similar manner, there is made octadecyl 2-ethyl-5-methylene-5-phenylvalerate by reacting octadecyl ethacrylate with α-methylstyrene.

*Example 7*

A mixture of 2360 parts (20 moles) of α-methylstyrene and 2550 parts (15 moles) of 2-ethylhexyl methacrylate containing 0.1% hydroquinone is reacted continuously, employing the operating conditions of 1000 p. s. i. g., 350° C., and an average contact time of four minutes. The condensate is stripped of low boiling material, washed twice with 10% sodium carbonate, once with water, dried and treated with decolorizing charcoal at 100° C. After removal of the carbon, the resulting very light solution is distilled at 160° C. at 3 mm. pressure yielding the product. The product, which corresponds to 2-ethylhexyl 2-methyl-5-methylene-5-phenylvalerate, is obtained in a conversion of about 35%.

*Example 8*

A mixture of 1180 parts (10 moles) of α-methylstyrene, 430 parts (5 moles) of methacrylic acid, 500 parts of toluene, five parts of water, and five parts of hydroquinone is pumped through a coil reactor. Operating conditions of 1000 p. s. i. g., 300° C., and average contact time of six minutes are employed. After removal of the solvent and unreacted starting materials, there is obtained the product, 2-methyl-5-methylene-5-phenylvaleric acid, neutral equivalent=216 (calculated 204).

In like manner, 2-methyl-5-methylene-5-phenylvaleric acid is prepared from acrylic acid and α-methylstyrene.

*Example 9*

A 500 ml. stainless steel rocking autoclave is charged with 118 parts of α-methylstyrene, 114 parts of ethyl methacrylate, and one part of hydroquinone. The system is flushed thoroughly with hydrogen and then pressurized to 500 p. s. i. g. with hydrogen. The system is rapidly heated to 325° C. and held at this temperature for 20 minutes, then cooled rapidly to below 100°. The reaction mixture is a light brown, clear liquid completely soluble in ether. The reaction mixture is charged to a distillation unit and distilled at reduced pressure. There is obtained as distillate the product, ethyl 2-methyl-5-methylene-5-phenylvalerate. The overall conversion to the desired ester is about 25%.

In a similar manner, the other compounds of this invention are prepared.

*Example 10*

To a flask equipped with stirrer, thermometer, and fractionation column of about five theoretical plates, there are charged 318 parts of methyl 2-methyl-5-methylene-5-phenylvalerate, 279 parts of lauryl alcohol, and one part of aqueous 98% sulfuric acid. The mixture is heated to 135° C. and the pressure regulated so that refluxing occurs gently at this temperature. The methanol distills off as the ester interchange occurs. After about 1½ hours, an additional 0.5 part of sulfuric acid is added. When the reaction is 97% completed, as determined by the weight of methanol obtained in a Dry Ice trap, the reaction mixture is cooled to 90% C. and washed with an aqueous 20% sodium carbonate solution. The organic layer is then stripped of excess lauryl alcohol to a temperature of 180° C. at 1 mm. pressure. The dodecyl 2-methyl-5-methylene-5-phenylvalerate is obtained in 95% yield as a light tan liquid.

We claim:

1. As a new composition of matter, the compound having the formula

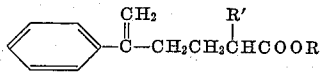

in which R' is a member of the class consisting of a hydrogen atom and a methyl group and R is a member of the class consisting of a hydrogen atom and an alkyl group of not over eighteen carbon atoms.

2. As a new composition of matter, the compound having the formula

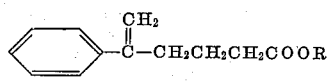

in which R is an alkyl group of no more than eighteen carbon atoms.

3. As a new composition of matter, the compound having the formula

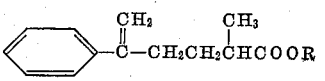

in which R is an alkyl group of no more than eighteen carbon atoms.

4. As a new composition of matter, methyl 2-methyl-5-methylene-5-phenylvalerate.

5. As a new composition of matter, ethyl 2-methyl-5-methylene-5-phenylvalerate.

6. As a new composition of matter, butyl 2-methyl-5-methylene-5-phenylvalerate.

7. As a new composition of matter, methyl 5-methylene-5-phenylvalerate.

8. As a new composition of matter, ethyl 5-methylene-5-phenylvalerate.

9. A method for the preparation of a compound having the formula

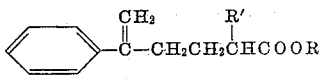

in which R' is a member of the class consisting of a hydrogen atom and a methyl group and R is a member of the class consisting of a hydrogen atom and an alkyl group of not over eighteen carbon atoms, which comprises bringing together at a reacting temperature and pressure in the range of about 200° to 450° C. and about 400 to 4000 p. s. i. g. α-methylstyrene with the compound

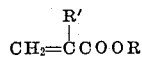

10. A method for the preparation of a compound having the formula

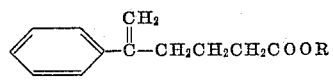

in which R is an alkyl group of no more than eighteen carbon atoms, which comprises bringing together at a reacting temperature and pressure in the range of about 200° to 450° C. and about 400 to 4000 p. s. i. g. α-methylstyrene with the compound

CH₂=CHCOOR

11. A method for the preparation of a compound having the formula

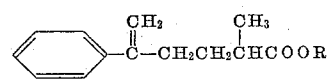

in which R is an alkyl group of no more than eighteen carbon atoms, which comprises bringing together at a reacting temperature and pressure in the range of about 200° to 450° C. and about 400 to 4000 p. s. i. g. α-methylstyrene with the compound

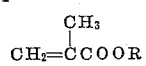

12. A method for the preparation of a compound having the formula

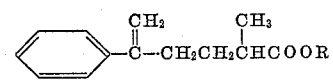

in which R is an alkyl group of one to eighteen carbon atoms, which comprises bringing together at a reacting temperature and pressure in the range of about 275° to 350° C. and about 1000 to 3000 p. s. i. g. α-methylstyrene with the compound

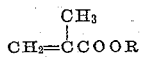

13. A method for the preparation of methyl 2-methyl-5-methylene-5-phenylvalerate which comprises bringing together at a reacting temperature and pressure in the range of about 275° to 350° C. and 1000 to 3000 p. s. i. g. α-methylstyrene and methyl methacrylate.

14. A method for the preparation of ethyl 2-methyl-5-methylene-5-phenylvalerate which comprises bringing together at a reacting temperature and pressure in the range of about 275° to 350° C. and 1000 to 3000 p. s. i. g. α-methylstyrene and ethyl methacrylate.

15. A method for the preparation of butyl 2-methyl-5-methylene-5-phenylvalerate which comprises bringing together at a reacting temperature and pressure in the range of about 275° to 350° C. and 1000 to 3000 p. s. i. g. α-methylstyrene and butyl methacrylate.

16. A method for the preparation of methyl 5-methylene-5-phenylvalerate which comprises bringing together at a reacting temperature and pressure in the range of about 275° to 350° C. and 1000 to 3000 p. s. i. g. α-methylstyrene and methyl acrylate.

17. A method for the preparation of ethyl 5-methylene-5-phenylvalerate which comprises bringing together at a reacting temperature and pressure in the range of about 275° to 350° C. and 1000 to 3000 p. s. i. g. α-methylstyrene and ethyl acrylate.

18. A method for the preparation of a compound having the formula

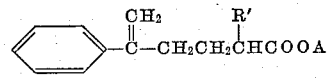

in which R' is a member from the class consisting of a hydrogen atom and a methyl group and A is an alkyl group of two to eighteen carbon atoms, which comprises bringing together at a reacting temperature and pressure in the range of about 200° to 450° C. and about 400 to 4000 p. s. i. g. α-methylstyrene and the compound having the formula

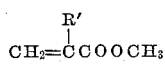

and transesterifying the resultant compound in the presence of an esterifying catalyst with a compound having the formula AOH.

References Cited in the file of this patent
UNITED STATES PATENTS

| | | |
|---|---|---|
| 2,244,487 | Crawford | June 3, 1941 |
| 2,244,645 | Jacobson | June 3, 1941 |
| 2,584,527 | Albisetti et al. | Feb. 5, 1952 |
| 2,628,252 | Albisetti | Feb. 10, 1953 |

OTHER REFERENCES

Beilstein, 9, 628 (1926).